(12) United States Patent
Toda et al.

(10) Patent No.: US 8,743,836 B2
(45) Date of Patent: Jun. 3, 2014

(54) RADIO COMMUNICATION METHOD AND BASE STATION

(75) Inventors: Takeshi Toda, Yokohama (JP); Shingo Joko, Yokohama (JP); Taku Nakayama, Yokohama (JP); Kenta Okino, Yokohama (JP)

(73) Assignee: Kyocera Corporation, Kyoto (JP)

(*) Notice: Subject to any disclaimer, the term of this patent is extended or adjusted under 35 U.S.C. 154(b) by 1427 days.

(21) Appl. No.: 12/447,892

(22) PCT Filed: Oct. 23, 2007

(86) PCT No.: PCT/JP2007/070670
§ 371 (c)(1),
(2), (4) Date: Feb. 18, 2010

(87) PCT Pub. No.: WO2008/053754
PCT Pub. Date: May 8, 2008

(65) Prior Publication Data
US 2010/0142441 A1 Jun. 10, 2010

(30) Foreign Application Priority Data
Oct. 30, 2006 (JP) .................. 2006-294995

(51) Int. Cl.
*H04W 4/00* (2009.01)
*H04J 99/00* (2009.01)
*H04W 16/30* (2009.01)
*H04W 48/12* (2009.01)

(52) U.S. Cl.
CPC .............. *H04W 16/30* (2013.01); *H04W 48/12* (2013.01); *H04J 15/00* (2013.01)
USPC ........... 370/334; 370/329; 370/338; 370/341; 370/437; 455/101; 455/422.1

(58) Field of Classification Search
CPC ..... H04W 72/04; H04W 88/08; H04W 76/00; H04W 52/40; H04W 84/12; H04W 80/04; H04W 84/18; H04W 88/06; H04W 74/08; H04W 84/08; H04W 76/02
USPC .......... 370/328–334, 338, 341, 437; 455/422.1, 101, 328–334, 338, 341, 455/437
See application file for complete search history.

(56) References Cited

U.S. PATENT DOCUMENTS 5,839,071 A * 11/1998 Johnson .................. 455/440
5,936,577 A 8/1999 Shoki et al. .................. 342/373

(Continued)

FOREIGN PATENT DOCUMENTS

GB 2425440 A 10/2006
JP 10-126139 5/1998

(Continued)

OTHER PUBLICATIONS

IEEE, "Physical and Medium Access Control Layers for Combined Fixed and Mobile Operation in Licensed Bands" IEEE Std. 802.16-2005 and IEEE Std 802.16-2004/Cor1-2005 (Amendment and Corrigendum to IEEE Std 802.16-2004), pp. 1-864, Feb. 28, 2006.

(Continued)

*Primary Examiner* — Christopher Grey
(74) *Attorney, Agent, or Firm* — DLA Piper LLP (US)

(57) ABSTRACT

Provided is a radio communication method employed in a base station having plural antenna elements. The method includes the steps of: setting an inner zone and an outer zone by dividing a cell formed by the base station into two; determining whether a mobile station is located in the inner zone or the outer zone on the basis of a predetermined criterion; notifying the mobile station located in the inner zone of control information, including information on channel allocation and a communication method, through a broadcast channel; and notifying the mobile station located in the outer zone of control information through a dedicated channel by beamforming using the plural antenna elements.

8 Claims, 9 Drawing Sheets

(56) References Cited

U.S. PATENT DOCUMENTS

| | | | |
|---|---|---|---|
| 6,167,035 A * | 12/2000 | Veeravalli et al. | 370/331 |
| 7,969,926 B2 * | 6/2011 | Choi et al. | 370/315 |
| 8,144,658 B2 * | 3/2012 | Damnjanovic et al. | 370/330 |
| 2004/0014482 A1 | 1/2004 | Kwak | |
| 2004/0063468 A1 * | 4/2004 | Frank | 455/561 |
| 2005/0186990 A1 | 8/2005 | Klomp et al. | 455/561 |
| 2006/0034236 A1 | 2/2006 | Jeong | |
| 2006/0198339 A1 * | 9/2006 | Marinier et al. | 370/329 |
| 2006/0209876 A1 | 9/2006 | Liu et al. | |

FOREIGN PATENT DOCUMENTS

| | | |
|---|---|---|
| JP | 2003-069469 | 3/2003 |
| JP | 2005-534217 | 11/2005 |
| KR | 2003-0086172 A | 11/2003 |
| KR | 2006-0015405 A | 2/2006 |
| WO | 9502306 A1 | 1/1995 |
| WO | 9701254 A1 | 1/1997 |
| WO | 9852364 A1 | 11/1998 |

OTHER PUBLICATIONS

Official Action issued on Nov. 15, 2010 in the counterpart Korean application with English translation lists the references above.

Extended European search report dated Apr. 9, 2013 issued in corresponding European application 07830404.5 cites the U.S. patent application publication and foreign patent documents listed above.

* cited by examiner (a)

(b)

(a)

(b)

(a)

(b)

RADIO COMMUNICATION METHOD AND BASE STATION

CROSS-REFERENCE TO THE RELATED APPLICATIONS

This application is a national stage of international application No. PCT/JP2007/070670 filed Oct. 23, 2007, which also claims the benefit of priority under 35 USC 119 to Japanese Patent Application No. 2006-294995 filed Oct. 30, 2006, the entire contents of which are incorporated herein by reference.

TECHNICAL FIELD

The present invention relates to a radio communication technology, particularly to a base station having plural antenna elements, and a radio communication method used in the base station.

BACKGROUND ART

In radio communications, the spatial division multiple access (SDMA) scheme using an adaptive array antenna is well known as a technique allowing effective use of frequency resources. The use of the adaptive array antenna enables communication with a communication destination located in a specific direction by adaptively forming a directional beam by the multiple antenna elements.

IEEE802.16e (Mobile WiMAX (trademark)) is known as a radio communication system employing the SDMA scheme. In the standard specification of IEEE802.16e, an AAS (Adaptive Array antenna System) diversity map is provided as an option in a downlink frame (hereinafter referred to as "DL frame") (See Non-Patent Document 1 and Non-Patent Document 2).

FIG. 1 shows a configuration of a TDD (Time Division Duplex) frame, including the AAS diversity map option, described in Non-Patent Documents 1 and 2. A broadcast map is provided in a frame header of the DL frame.

A broadcast map is control information notified to mobile stations through a channel shared by multiple mobile stations, that is, through a broadcast channel. The broadcast map also includes a DL map that is allocation information of downlink data bursts, and an UL map that is allocation information of uplink data bursts. In contrast, an AAS diversity map is transmitted by using a beamforming transmission or a diversity transmission to a certain mobile station by an AAS function of the base station.

If, at a cell edge, the mobile station cannot acquire the broadcast map transmitted by the base station, the mobile station scans the AAS diversity map preceded by the broadcast map in the same frame.

The AAS diversity map includes allocation information of the broadcast map transmitted by the beamforming at other channels. The mobile station receives the broadcast map transmitted by the beamforming on the basis of the allocation information included in the AAS diversity map.

Non-Patent Document 1: IEEE Std 802.16e 2005
Non-Patent Document 2: IEEE Std 802.16-2004/Corl-2005

DISCLOSURE OF THE INVENTION

As described above, an AAS diversity map is transmitted by using a beamforming transmission or a diversity transmission to a certain mobile station, by the AAS function of a base station. For this reason, the mobile station may fail to receive the AAS diversity map even by scanning the AAS diversity map.

Table 1 shows a relationship between a spatial correlation characteristic (beam width) at the transmission of the AAS diversity map and the receivability of the AAS diversity map, as well as a relationship between the spatial correlation characteristic and the coverage.

TABLE 1

| | Spatial Correlation Characteristic (Beam Width) | |
|---|---|---|
| | When spatial correlation is broad | When spatial correlation is sharp |
| Receivability | ○ | x |
| Coverage | x | ○ |

As shown in Table 1, when the spatial correlation is broad, a ratio of area where the mobile station can receive the AAS diversity map is relatively high. Accordingly, the mobile station can receive the AAS diversity map more easily than when the spatial correlation is sharp. On the other hand, when the spatial correlation is sharp, a ratio of area where the mobile station can receive the AAS diversity map is relatively low. Accordingly, it is more difficult for the mobile station to receive the AAS diversity map than when the spatial correlation is broad.

In addition, when the spatial correlation is broad, a beamforming/diversity gain is relatively low. Accordingly, the coverage of the AAS diversity map is narrower and inter-cell interference is larger than when the spatial correlation is sharp. In contrast, when the spatial correlation is sharp, the beamforming/diversity gain is relatively high. Accordingly, the coverage of the AAS diversity map is wider and the inter-cell interference is smaller than when the spatial correlation is broad.

In this way, basically, the receivability of the AAS to diversity map and the coverage have a trade-off relationship. For the improvement at the cell edge and the reduction of an out of service area, the spatial correlation characteristic needs to be sharp to some extent, and the signal-to-interference-plus-noise ratio (SINR) needs to be higher. As described above, however, if the spatial correlation is made sharper, the receivability of the AAS diversity map is lowered.

If failed to receive a map, the mobile station cannot acquire allocation information on an uplink and, as a result, cannot send back a signal to the base station. Consequently, communications become unstable. Hence, there is a problem that using the AAS diversity map alone still causes a mobile station at the cell edge to have difficulty in performing stable communications. In particular, this is a serious problem in traffic, such as streaming or VoIP (Voice over Internet Protocol), that requires real time communications.

In view of the above problem, the present invention aims to provide a radio communication method and a base station which allow a mobile station to perform stable communications at a cell edge of a base station having multiple antenna elements.

In order to attain the aforementioned objects, a characteristic of the present invention is summarized as a radio communication method used in a base station including plural antenna elements. The method includes the steps of: setting an inner zone and an outer zone by dividing a cell formed by the base station into two; determining whether a mobile station is located in the inner zone or the outer zone, on the basis of a predetermined criterion; notifying the mobile station located in the inner zone of control information, including information on channel allocation and a communication method, through a broadcast channel; and notifying the mobile station located in the outer zone of the control information through a dedicated channel by beamforming using the multiple antenna elements.

With the method, the cell formed by the base station is divided into the inner zone and the outer zone, the control information is notified, through the broadcast channel, to the mobile station located in the inner zone, whereas the control information is notified, through dedicated channels by beamforming, to the mobile station located in the outer zone. Thus, even the mobile station located in the outer zone can easily receive the control information and thus the mobile station located in the outer zone can perform stable communications. Consequently, the mobile stations can perform stable communications at a cell edge of the base station.

In the radio communication method according to the above characteristic, in the step of determining, determination is preferably made whether or not the mobile station located in the inner zone has reached an end of the inner zone by moving towards the outer zone, and in the step of notifying the control information through the dedicated channel, the dedicated channel is preferably allocated to the mobile station that has reached the end of the inner zone.

With the method, when the mobile station moves from the inner zone to the outer zone, the control information is notified to the mobile station before communication becomes unstable resulting from the failure of receiving the notified control information by the mobile station. Consequently, the mobile station that has moved from the inner zone to the outer zone can reliably receive the control information. Accordingly, the mobile station can perform stable communication even at the cell edge and in the outer zone.

In the radio communication method according to the above characteristic, in the step of determining, at least one of path loss, received signal strength, a signal-to-interference-plus-noise ratio, and an amount of interference, which are detected during communication with the mobile station, is preferably used as the predetermined criterion.

With the method, detection as to whether each mobile station is located in the inner zone or the outer zone is made on the basis of at least one of the path loss, the received signal strength, the signal-to-interference-plus-noise ratio, or the amount of interference. Accordingly, the determination can be easily made as to whether the mobile station is located in the inner zone or the outer zone.

In the radio communication method according to the above characteristic, in the step of setting, a zone size of the outer zone is preferably set based on a beamforming gain calculated according to the number of the antenna elements.

With the method, the zone size of the outer zone can be favorably set since the zone size of the outer zone is set on the basis of the beamforming gain.

In the radio communication method according to the above characteristic, in the step of setting, the zone size of the outer zone is preferably set based on the beamforming gain obtained when the maximum number of multiplexed spaces by the SDMA scheme is used.

With the method, the zone size of the outer zone can be set on the basis of the beamforming gain when the number of multiplexed spaces by the SDMA scheme is the largest because the beamforming gain varies depending on the number of multiplexed spaces in the SDMA scheme. Thus, the zone size of the outer zone can be successfully set even in the SDMA scheme.

In the radio communication method according to the above characteristic, in the step of setting, the inner zone and the outer zone are preferably set in a way that a part of the inner zone overlaps with a part of the outer zone formed by an adjacent base station, and the inner zone does not overlap with the inner zone formed by the adjacent base station.

The method can prevent generation of any area where the mobile station has difficulty in performing stable communications as with the receipt of interference from adjacent base stations. Accordingly, even a mobile station located at a cell edge can perform stable communications.

The radio communication method according to the above characteristic preferably including the step of controlling a first period and a second period by time division, where communications with the mobile station located in the inner zone are performed in the first period, and where communications with the mobile station located in the outer zone are performed in the second period. In the radio communication method, the first period is preferably synchronized with the first period for the adjacent base station, and the second period is preferably synchronized with the second period for the adjacent base station.

The method can prevent generation of interference to be caused by overlapping the part of the inner zone with the part of the outer zone formed by the adjacent base station.

In the radio communication method according to the above characteristic, in the step of controlling, at least for every frame, a time division ratio between the first period and the second period is preferably optimized according to a communication condition of the base station.

With the method, the time division ratio of the first period and the second period is optimized for at least every frame depending on the communication state of the base station. Accordingly, the time division ratio can be set more precisely.

Another characteristic of the present invention is summarized as a base station having plural antenna elements, including: a setting unit configured to set an inner zone and an outer zone by dividing a cell formed by the base station into two; a determination unit configured to determine whether a mobile station is located in the inner zone or the outer zone, on the basis of a predetermined criterion; and a communication controller configured to notify the mobile station located in the inner zone of control information, including information on channel allocation and a communication method, through a broadcast channel. In the base station, the communication controller notifies the mobile station located in the outer zone of the control information through a dedicated channel by beamforming using the plural antenna elements.

The present invention can provide a radio communication method and a base station which allow mobile stations to perform stable communications at a cell edge of the base station including multiple antenna elements.

BRIEF DESCRIPTION OF THE DRAWINGS

FIG. 1 is a view showing a configuration example of a TDD frame in a radio communication system according to a background art of the present invention.

FIG. 2 is a view showing an example of a cell zone configuration in the radio communication system according to a first embodiment of the present invention.

FIG. 3 is a functional block diagram showing an example of a configuration of a base station according to the first embodiment of the present invention.

FIG. 4 is a view showing a frame configuration example of a DL frame in the radio communication system according to the first embodiment of the present invention.

FIG. 6 is a flow chart showing an example of a procedure of a radio communication method according to the first embodiment of the present invention.

FIG. 8 is a view showing a configuration example of a cell zone in a radio communication system according to a second embodiment of the present invention.

FIG. 9 is a view showing one example of a method for arranging adjacent cells in the radio communication system according to the second embodiment of the present invention.

FIG. 10 is a view showing a frame configuration example of a DL frame in the radio communication system according to the second embodiment of the present invention.

FIG. 11 is a view showing a frame configuration example of the DL frame among respective cells in the radio communication system according to the second embodiment of the present invention.

BEST MODE FOR CARRYING OUT THE INVENTION

Figure 1:
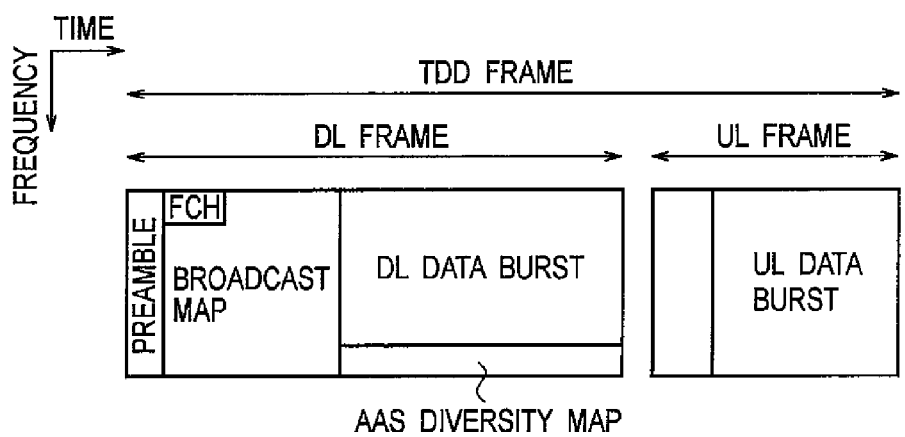
[FIG. 1]

A first embodiment and a second embodiment of the present invention will be described hereinafter with reference to the drawings. In the following description of the drawings for the first and the second embodiments, the same or similar reference numerals are given to the same or similar parts.
[First Embodiment]
(Configuration Example of Cell Zone)

Figure 2:
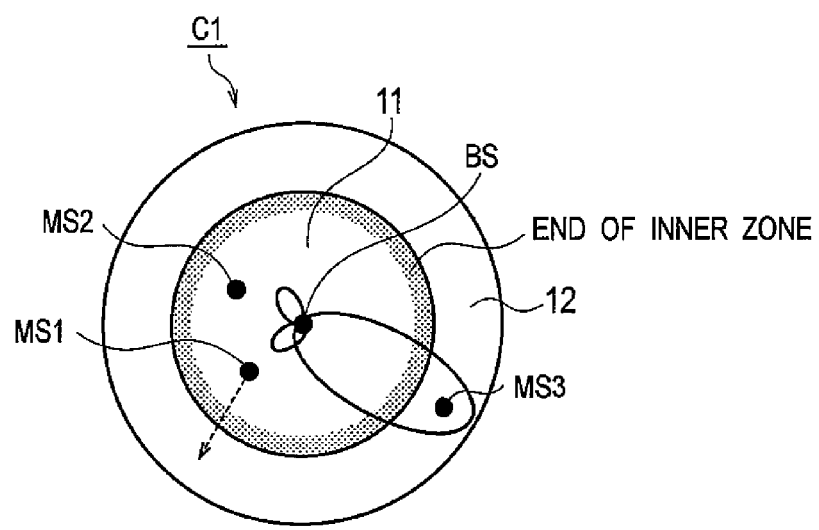
[FIG. 2]

First, a configuration example of a cell zone of a radio communication system according to the present invention will be described. In this embodiment, the description is made exemplifying a radio communication system based on IEEE802.16e (Mobile WiMAX (trademark)). FIG. 2 is a view showing a cell zone configuration of the radio communication system according to this embodiment.

The example of FIG. 2 shows a base station BS and three mobile stations MS1 to MS3 (hereinafter referred to as "mobile stations MS," as appropriate). The base station BS according to this embodiment has multiple antenna elements. The base station BS dynamically selects a method of utilizing a multi antenna technique such as beamforming, SDMA, diversity or MIMO (Multiple Input Multiple Output), depending on QoS (Quality of Service)/GoS (Grade of Service), a radio propagation environment, network load, and an amount of interference of adjacent cells, or the like.

The cell C1 formed by the base station BS is divided into an inner zone 11 and an outer zone 12 which are concentrically arranged. When performing communications with the mobile station MS3 located in the outer zone 12, the base station BS always uses dedicated channels specific to beamforming (hereinafter referred to as "channels dedicated for beamforming").

In addition, the base station BS notifies the mobile station MS3 located in the outer zone 12 of control information specific to each mobile station (hereinafter referred to as "private map") through the channels dedicated for beamforming. In addition, dedicated channels mean channels individually allocated to each mobile station.

In contrast, when performing communications with the mobile stations MS1 and MS2 located in the inner zone 11, the base station BS utilizes not only the beamforming, but also a multi antenna technique other than beamforming, such as diversity or MIMO or the like.

The base station BS notifies the mobile stations MS1 and MS2 located in the inner zone 11 of a broadcast map through a broadcast channel. A signal-to-interference-plus-noise ratio (SINR) in the inner zone 11 is high enough to allow the broadcast map to be notified. Consequently, use of the beamforming or SDMA scheme is not necessarily needed in the inner zone 11.

In addition, the broadcast map is control information that is provided in a frame header of a DL frame and notified to multiple mobile stations. The broadcast map includes a DL map that is allocation information on downlink data bursts and an UL map that is allocation information on uplink data bursts.

The base station BS detects that the mobile station MS located in the inner zone 11 has moved to an end of the inner zone 11. Then, the base station BS allocates the dedicated channel for beamforming to the mobile station MS that has moved to the end of the inner zone 11, and notifies a private map through the allocated dedicated channel for beamforming.

In this way, the dedicated channel for beamforming is allocated to the mobile station MS, before communications become unstable because the mobile station MS has failed to receive a broadcast map after moving to the end of the inner zone 11. Accordingly, the mobile station MS can continue to perform stable communications even in the outer zone 12.
(Configuration Example of Base Station)

Figure 3:
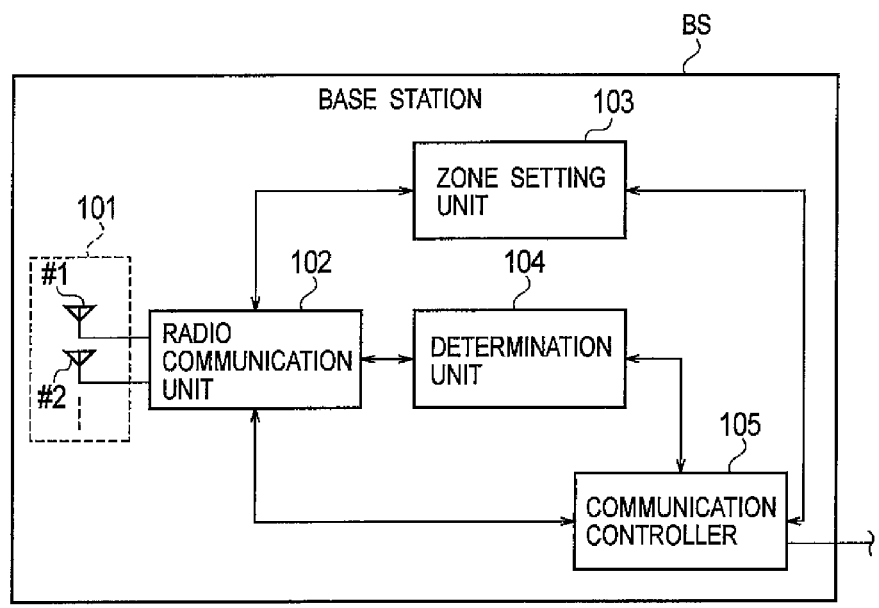
[FIG. 3]

A configuration example of the base station BS according to this embodiment will be described hereinafter. FIG. 3 is a functional block diagram showing a configuration example of the base station BS according to this embodiment.

The base station BS according to this embodiment includes an antenna unit 101, a radio communication unit 102, a zone setting unit 103, a determination unit 104, and a communication controller 105. The antenna unit 101 includes multiple antenna elements #1, #2, . . . .

The radio communication unit 102 includes a power amplifier/high frequency unit which performs amplification of radio signals and conversion of frequencies or the like, a signal processor for processing radio signals, and the like.

The zone setting unit 103 divides a cell formed by the base station BS into two zones, the inner zone 11 and the outer zone 12, and sets the inner zone 11 and outer zone 12 which are concentrically located. The zone setting unit 103 also performs setting of zone size of the inner zone 11 and of the outer zone 12 or the like.

The determination unit 104 determines whether the mobile station MS is located in the inner zone 11 or the outer zone 12, on the basis of a predetermined criterion. Specifically, the determination unit 104 determines whether the mobile station MS is located in the inner zone 11 or the outer zone 12, by using at least one of path loss, received signal strength (RSSI), a signal-to-interference-plus-noise ratio (SINR), or an amount of interference which are estimated during communications with the mobile stations MS. In addition, a value of the path loss, the RSSI, the SINR, the amount of interference or the like is a value obtained by moving-averaging values of instantaneous fading variation and considering long section variation and shadowing variation.

The communication controller 105 controls communications with the mobile station MS in the cell C1 (inner zone 11 and outer zone 12). The communication controller 105 also notifies a broadcast map to the mobile station MS located in the inner zone 11 through the broadcast channel.

On the one hand, using the multiple antenna elements #1, #2, . . . , the base station BS separately notifies the mobile station MS located in the outer zone 12 of a private map through the dedicated channel for beamforming. Additionally, the communication controller 105 also communicates with the network side, for example, Radio Network Controller (RNC).

In addition, the determination unit 104 determines whether or not the mobile station MS located in the inner zone 11 has reached an end of the inner zone 11 after moving toward the outer zone 12. The communication controller 105 allocates the dedicated channel for beamforming to the mobile station MS which has reached the end of the inner zone 11.

(One Example of Frame Configuration)

Figure 4:
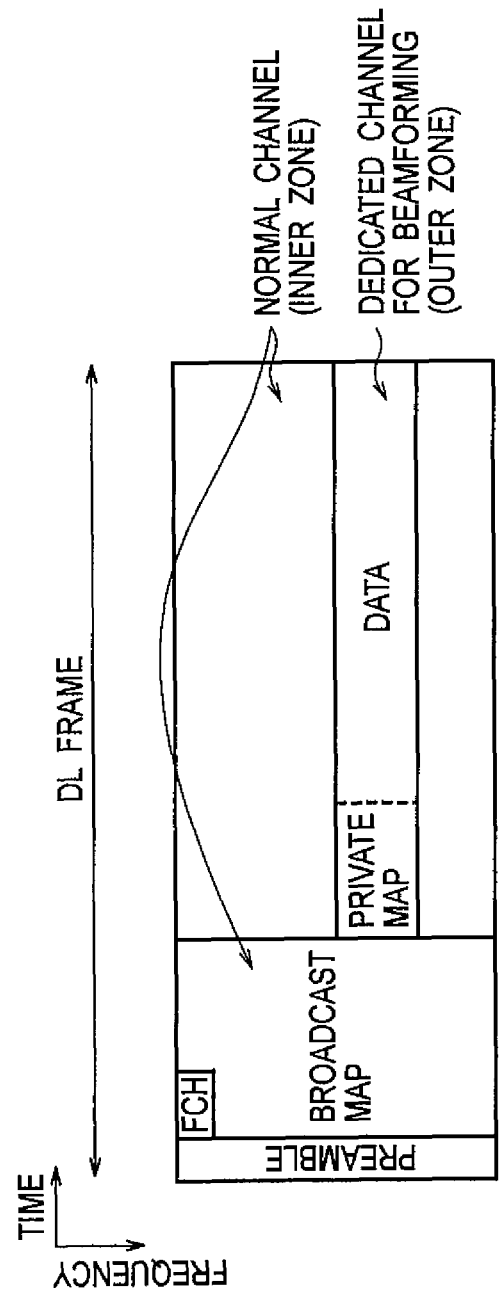
[FIG. 4]

A configuration example of a DL frame in the radio communication system according to this embodiment will be described hereinafter. FIG. 4 is a view showing a configuration example of the DL frame in the radio communication system according to this embodiment.

The DL frame shown in FIG. 4 includes a frame header, a downlink data burst, a private map or the like. The frame header is transmitted to the mobile station MS located in the inner zone 11 through the broadcast channel. In addition, the downlink data burst is transmitted to the mobile station MS located in the inner zone 11 through a normal channel. On the one hand, the private map (and data) is transmitted to the mobile station MS in the outer zone 12 through the dedicated channel for beamforming.

(One Example of Zone Size Setting Method)

A method of setting zone size of the inner zone 11 and of the outer zone 12 by the base station BS will be described hereinafter with reference to FIG. 5.

As is conventionally done, designing of the zone size of the inner zone 11 is performed on the basis of allowable propagation loss based on the equivalent isotropically radiated power (EIRP). Specifically, a zone size of the inner zone 11 is set at the end of the inner zone 11 to be in a range in which the mobile station MS can receive the broadcast map to some extent.

The designing of the outer zone 12 is performed considering a beamforming gain, in addition to the EIRP. The designing of the outer zone 12 varies according to whether beamforming is used or SDMA is used. The zone size is obtained based on the allowable propagation loss calculated in consideration of a beamforming gain in the case of the beamforming, or, in contrast, in consideration of a beamforming gain obtained when the maximum number of SDMAs is used. In the following, the method for setting the zone size of the outer zone 12 will be described in detail for (1) the case of beamforming and (2) the case of SDMA.

(In the Case of Beamforming)

The beamforming gain BGain is calculated with the following expression:

$$BGain = 10 * \log 10 \{\text{the number of antenna elements}\} \quad (1)$$

Using path loss model, a propagation distance that provides path loss corresponding to a beamforming gain calculated with the expression (1) is calculated back, and the calculated propagation distance is set as a zone size of the outer zone 12. FIG. 5(*a*) shows a spatial correlation characteristic (element spacing=3.5λ) of a 12-element equidistant circular array.

(In the Case of SDMA)

Calculation is made similarly to the case of beamforming. However, in the case of SDMA, a beam gain varies depending on the number of SDMA (the number of multiplexed spaces). Thus, a propagation distance that provides path loss corresponding to a beamforming gain when the beam gain is the smallest, that is, in the maximum number of multiplexed spaces of SDMA, is calculated using the path loss model, and the calculated propagation distance is set as a zone size. The beamforming gain BGain in the maximum number of multiplexed spaces of SDMA can be given by the following expression:

$$BGain = 10 * \log 10 \{\text{number of antenna elements}\} - 10 * \log 10 \{\text{maximum number of multiplexed spaces of } SDMA\} \quad (2)$$

Figure 5:
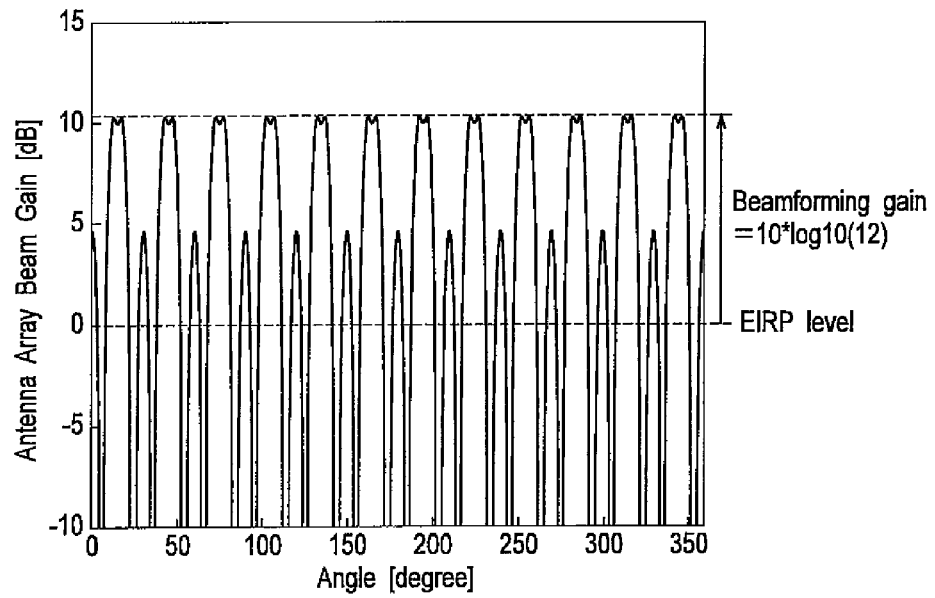
[FIG. 5] FIG. 5 (*a*) and FIG. 5 (*b*) are views for illustrating one example of zone size setting in the radio communication system according to the first embodiment of the present invention.
Figure 5:
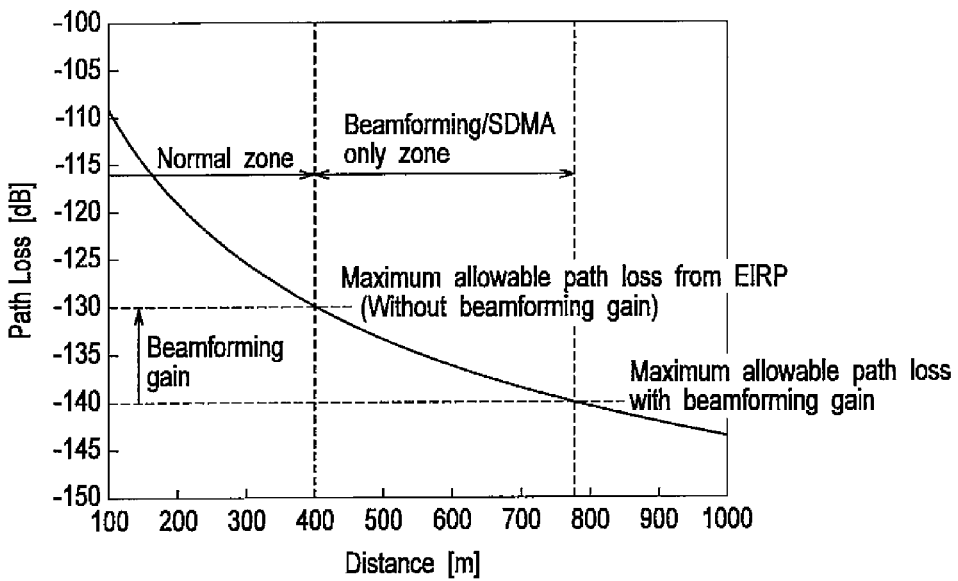

FIG. 5 (*b*) shows a concrete design example. For the path loss model, Extended COST231-Hata Model for metropolitan, carrier frequency=2.5 GHz, and height of the antenna of the base station/mobile stations=32/1.5 m are assumed.

When the maximum allowable path loss in a conventional EIRP that does not consider beamforming gain is −130 dB, the zone size of the inner zone 11 is approximately 400 m. Since the beam gains of the 12 antennas are calculated as 10*log 10(12)=10[dB], the maximum allowable path loss by the beamforming is calculated as 140 dB, and the size from the center is calculated approximately as 780 m. Accordingly, the width of the outer zone 12 is designed to be 780−400=380 m.

(Example of Connection Control Flow)

Figure 6:
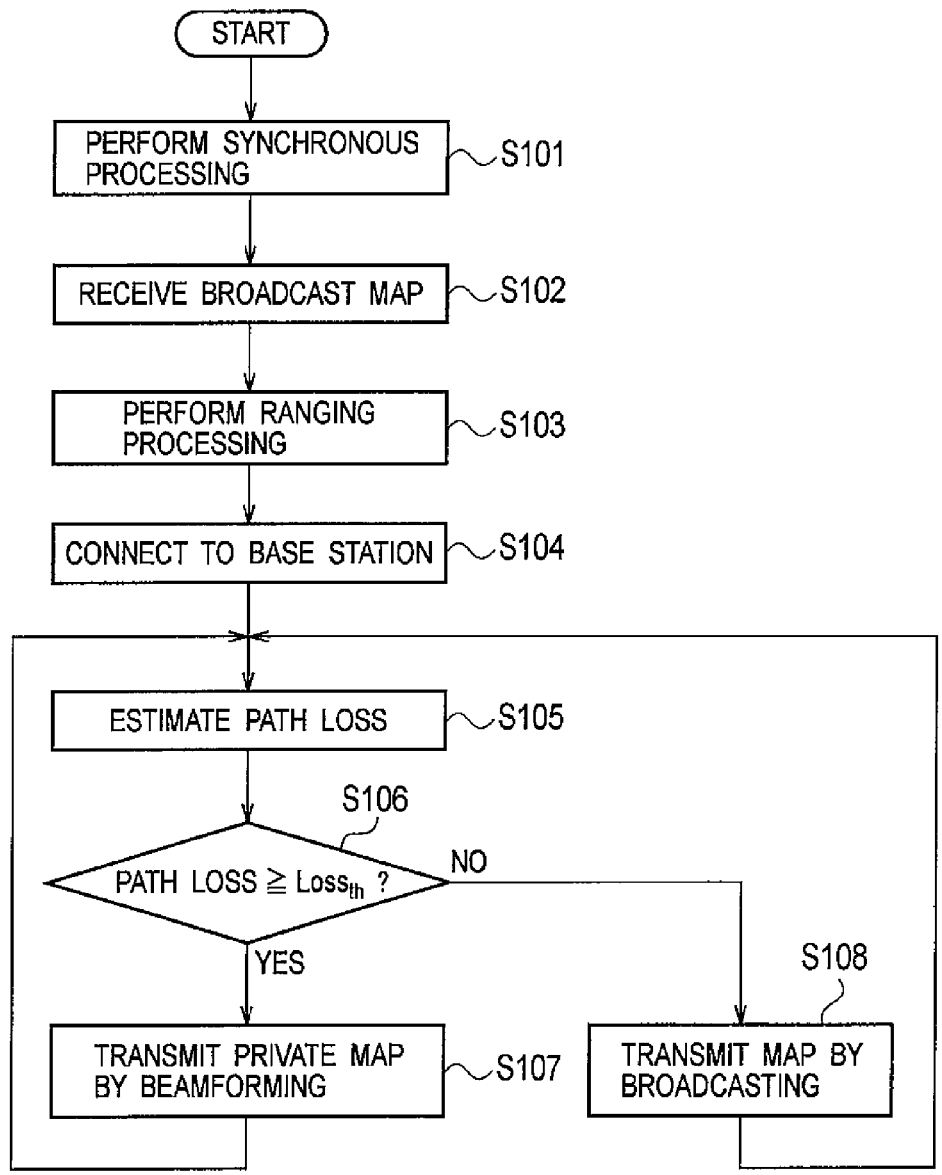
[FIG. 6]

An example of connection control flow between the base station BS and the mobile stations MS will be described hereinafter. FIG. 6 is a flow chart showing an example of connection control flow between the base station BS and the mobile stations MS. Note that, the case where the estimated path loss measured by the base station is used as a determination criterion on which zone the mobile station MS is located will be described.

In step S101, synchronous processing between the base station BS and the mobile station MS is performed.

In step S102, the mobile station MS receives a broadcast map from the base station BS. In step S103, ranging process is performed between the base station BS and the mobile station MS. In step S104, the mobile station MS is connected to the base station BS.

In step S105, the base station BS estimates path loss. In step S106, the base station BS compares the path loss estimated in step S105 with a preset threshold $Loss_{th}$. When the path loss estimated in step S105 is not less than the threshold $Loss_{th}$, processing proceeds to step S107. On the one hand, if the path loss estimated in step S105 is smaller than the threshold $Loss_{th}$, processing proceeds to step S108.

In step S107, the base station BS transmits a private map to the mobile station MS through the dedicated channel for beamforming.

In step S108, the base station BS transmits a map to the mobile station MS by broadcasting.

(Operation Sequence Example of Base Station and Mobile Stations)

Figure 7:
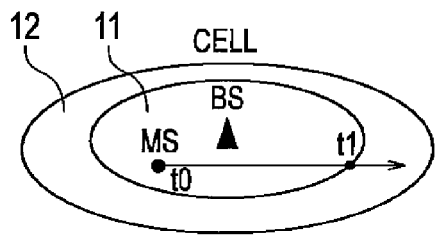
[FIG. 7] FIG. 7(*a*) and FIG. 7(*b*) are views for illustrating an example of operating sequence of the radio communication system according to the first embodiment of the present invention.
Figure 7:
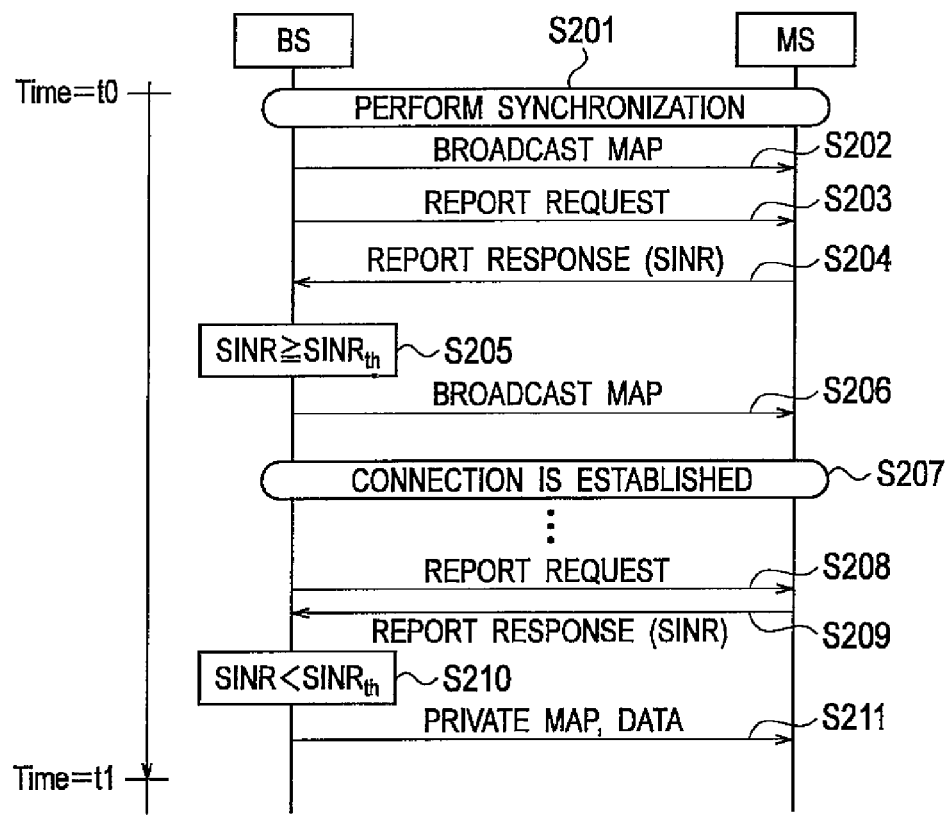

An operation sequence example of the base station BS and the mobile station MS will be described hereinafter. Specifically, as shown in FIG. 7 (*a*), description is given of the operation of the mobile station MS which is located in the inner zone 11 at time t0, moves towards the outer zone 12, and then reaches the boundary between the inner zone 11 and the outer zone 12 at time t1. FIG. 7(*b*) is a sequence diagram showing an operation sequence example of the base station BS and the mobile station MS. Note that, the description is given of the case in which SINR is used as the determination criterion of whether the mobile station MS is located in the inner zone 11 or the outer zone 12.

In step S201, synchronous processing between the base station BS and the mobile station MS is performed.

In step S202, the base station BS notifies the mobile station MS of a broadcast map through the broadcast channel.

In step S203, the base station BS notifies the mobile station MS of a report request of SINR.

In step S204, the mobile station MS measures SINR in response to a signal received from the base station BS and notifies the base station BS of the measurement result as a report response.

In step S205, the base station BS compares the report response (SINR) notified in step S204 with a preset threshold $SINR_{th}$. Here, the report response (SINR) notified in step S204 is not less than the preset threshold $SINR_{th}$. In this case, the base station BS determines that the mobile station MS is located inside the inner zone 11.

In step S206, the base station BS notifies the mobile station MS of a broadcast map through the broadcast channel. In step S207, a connection is established between the base station BS and the mobile station MS.

In step S208, the base station BS notifies the mobile station MS of the report request of SINR.

In step S209, the mobile station MS measures SINR in response to a signal received from the base station BS, and notifies the base station BS of the measurement result as the report response.

In step S210, the base station BS compares the report response (SINR) notified in step S209 with the preset threshold $SINR_{th}$. Here, the report response (SINR) notified in step S204 is smaller than the present threshold $SINR_{th}$. In this case, the base station BS determines that the mobile station MS is located at the end of the inner zone 11.

In step S211, the base station BS allocates the dedicated channel for beamforming to the mobile station MS, and transmits a private map and data to the mobile station MS through the allocated dedicated channel for beamforming.

(Operation and Effect)

As described above in detail, according to this embodiment, the base station BS individually notifies each of the mobile stations MS of control information by using beamforming, before communications become unstable because the mobile station MS connected to the base station BS has failed to receive a broadcast map after moving to the end of coverage (inner zone 11) of the broadcast map.

Consequently, the mobile station MS that has moved from the inner zone 11 to the outer zone 12 can perform stable communications in the outer zone 12, and can achieve the improvement at the cell edge and the reduction of out of service areas.

[Second Embodiment]

In a second embodiment of the present invention, a configuration in which the method for forming a cell zone according to the first embodiment described above is applied to a cellular network system will be described. Note that, in this embodiment, points that are different from the first embodiment will be mainly described and duplicated description will be omitted.

(Example of Cell Zone Configuration)

Figure 8:
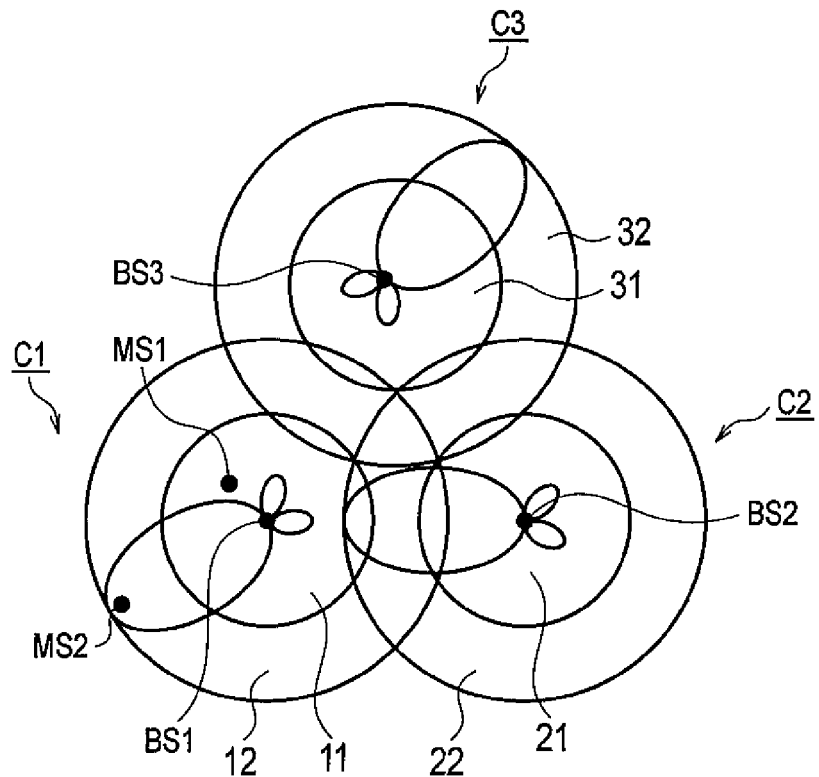
[FIG. 8]

FIG. 8 shows a configuration example of cell zone in the radio communication system according to this embodiment. In the example of FIG. 8, three cells C1 to C3 are respectively formed by three base stations BS1 to BS3 (hereinafter collectively referred to as "base stations BS," as appropriate).

The cell C1 is formed of an inner zone 11 and an outer zone 12 which are concentrically arranged. The cell 2 is formed of an inner zone 21 and an outer zone 22 which are concentrically arranged. The cell C3 is formed of an inner zone 31 and an outer zone 32 which are concentrically arranged.

The base station BS1 has the inner zone 11 and the outer zone 12 set in a way that parts of the inner zone 11 overlap with parts respectively of the outer zones 22 and 32 formed by the adjacent base stations BS2 and BS3, and that the inner zone 11 does not overlap with the inner zones 21 and 31 formed by the adjacent base stations BS2 and BS3.

Similarly, the base station BS2 has the inner zone 21 and the outer zone 22 set in a way that parts of the inner zone 21 overlap with parts respectively of the outer zones 12 and 32 formed by the adjacent base stations BS1 and BS3, and that the inner zone 21 does not overlap with the inner zones 11 and 31 formed by the adjacent base stations BS1 and BS3.

The base station BS3 sets the inner zone 31 and the outer zone 32 so that parts of the inner zone 31 overlap with parts of the outer zones 12 and 22 respectively formed by the adjacent base stations BS1 and BS2, and that the inner zone 31 does not overlap with the inner zones 11 and 21 respectively formed by the adjacent base stations BS1 and BS2.

(One Example of Zone Time Division Method)

Figure 9:
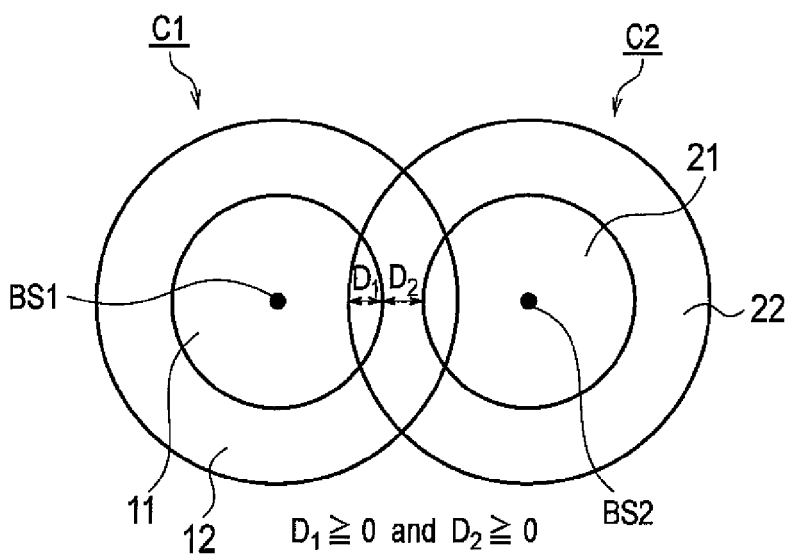
[FIG. 9]

One example of time dividing the inner zone and the outer zone in the cell zone configuration example described above will be described hereinafter with reference to FIG. 9 to FIG. 11.

In the configuration example of cell zone described above, inter-cell interference occurs between the cells that are adjacent to each other because a part of the inner zone of one of the cells overlaps with a part of the outer zone of the other one of the cells. As shown in FIG. 9, for example, the problem arises in that an area increases where communications become unstable due to the inter-cell interference, with the increase of a distance D1 by which the inner zone 11 of the cell C1 overlaps with the outer zone 22 of the cell C2.

Figure 10:
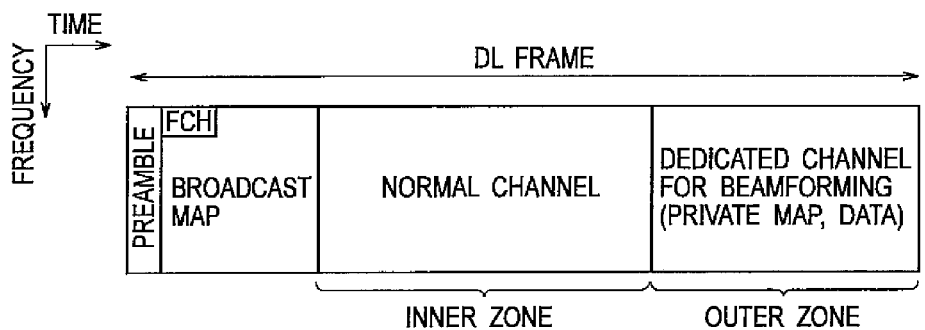
[FIG. 10]

As shown in FIG. 10, the inner zone and the outer zone are allocated by time division as a solution to the problem. In other words, the base station BS controls by time division a period for communicating with the mobile station MS in the inner zone and a period for communicating with the mobile station MS in the outer zone.

Figure 11:
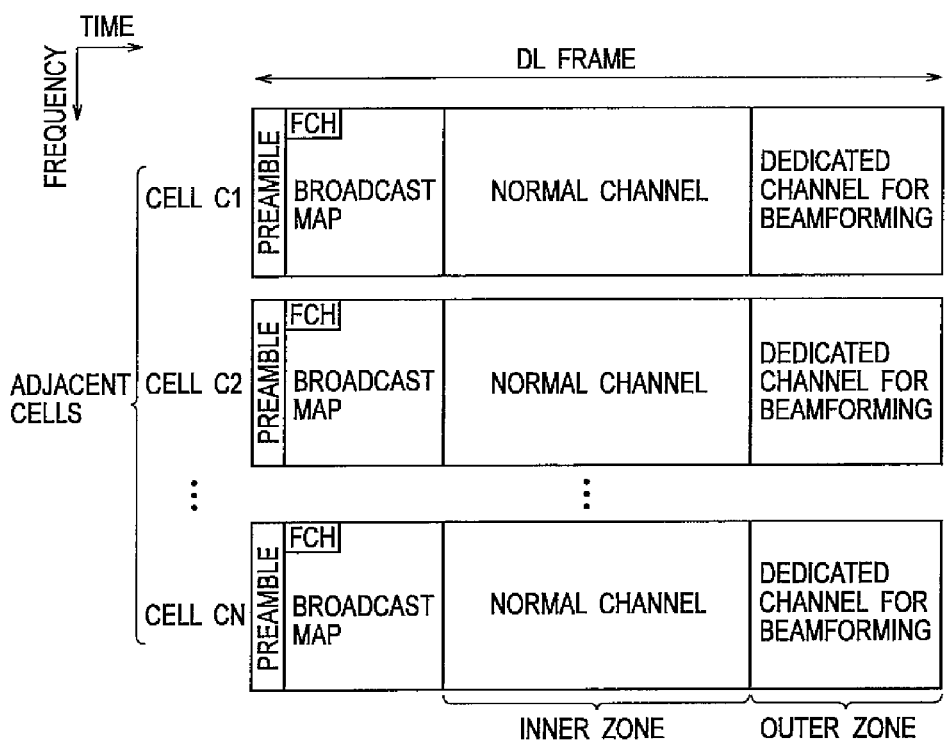
[FIG. 11]

Specifically, as shown in FIG. 11, in the adjacent cells (cell C1 to cell CN (N; an integer not less than 2)), periods of the inner zones are synchronized and periods of the outer zones are synchronized. As a result, the problem that communications become unstable due to the inter-cell interference in the overlapping area of the inner zone and the outer zone can be solved.

(One Example of Method for Setting Zone Time Division Ratio)

Description is given of one example of a method for setting a zone time division ratio when the inner zone and the outer zone are allocated by time division hereinafter with reference to FIG. 12.

Figure 12:
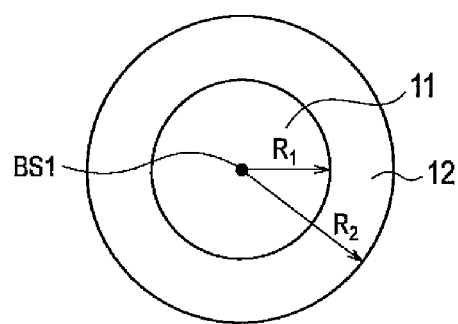
[FIG. 12] FIG. 12 (*a*) and FIG. 12 (*b*) are views for showing one example of a zone time division method employed in the radio communication system according to the second embodiment of the present invention.
Figure 12:
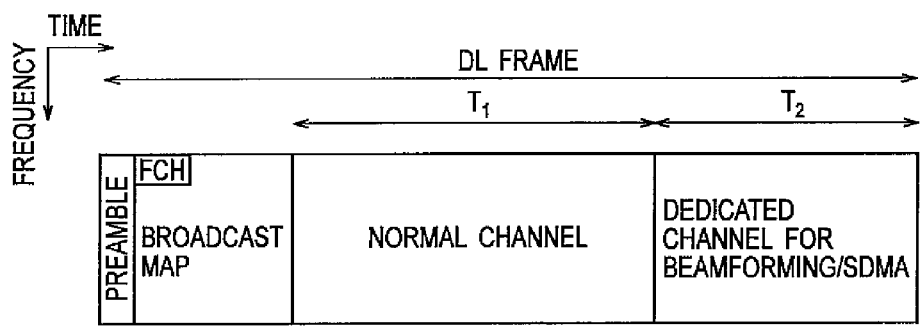

As shown in FIG. 12 (a), in the cell zone configuration described above, a zone size of the inner zone is "R1" and a zone size of the outer zone is "R2." In addition, as shown in FIG. 12(b), a period for normal channel in the DL frame is "T1" and a period for dedicated channel for beamforming is "T2."

In general, user distribution in a cell is assumed to be uniform in the cell. Thus, basically, "T1" and "T2" are adjusted according to a ratio of areas of the inner zone and the outer zone. However, due to distance attenuation and increased interference of the adjacent cells, SINR in the outer zone is lower than that in the inner zone.

Consequently, in the outer zone 12, a modulation scheme, an encoding ratio, the multiplexed number of SDMA or the like that depends on SINR are different from that in the inner zone. Based on this, a time division ratio for channels dedicated for beamforming is adjusted with the following expression,

[Expression 1]

$$\frac{T_1}{T_2} = A * \frac{R_1^2}{R_2^2 - R_1^2} \quad (3)$$

where "A" is a parameter that is dynamically tuned at least for every frame, depending on radio propagation environment, an amount of interference of adjacent cells, network load (for example, the number of connected mobile stations, a modulation scheme or an encoding rate), the multiplexed number of SDMA or the like.

(Operation and Effect)

As described above in detail, this embodiment can reduce inter-cell interference among adjacent base stations, and prevent generation of areas where mobile stations have difficulty in implementing stable communications, thereby allowing a mobile station MS at a cell edge to perform stable communications.

(Other Embodiments)

As described above, the present invention was disclosed through the first and the second embodiments. However, it should not be construed that the description and drawings constituting a part of this disclosure will limit the present invention. Various alternative embodiments, examples, and application techniques will be apparent to those skilled in the art from this disclosure.

For example, the base station BS may dynamically control zone size of the inner zone and of the outer zone depending on at least one of traffic load, or the number of mobile stations connected to the base station BS.

In the first and the second embodiments described above, description was made exemplifying the radio communication system based on IEEE802.16e (Mobile WiMAX (trademark)). However, the cell zone configuration example or the method for allocating dedicated channel for beamforming according to the first and the second embodiments described above may be applicable not only to the radio communication system based on the IEEE802.16e (Mobile WiMAX (trademark)), but also to any radio communication system employing the multi antenna technology.

In addition, in the first embodiment described above, the method for notifying control information when the mobile station located in the inner zone has moved towards the outer zone was described. However, in addition to this notifying method, the base station may perform a notifying method as described below.

Specifically, in the first embodiment, in the case where a mobile station is located in the outer zone, and where the mobile station located in the outer zone moves to the inner zone, the base station notifies the mobile station located in the outer zone of control information through a dedicated channel by beamforming. When the mobile station moves to the inner zone in this condition, the base station notifies the control information through the broadcast channel, and stops notifying the control information (notifying control information) through the dedicated channel by beamforming.

This is because notifying control information through broadcast channel is desirable because the size of overhead relative to a transmission rate of dedicated information channel for each mobile station is larger than that of the broadcast channel shared by multiple the mobile stations.

In this way, it should be understood that the present invention includes various embodiments that have not been described herein. Thus, the present invention shall be defined only by inventive specific matters according to the scope of claims that is appropriate from the above description.

The content of Japanese Patent Application No. 2006-294995 (filed on Oct. 30, 2006) is incorporated herein by reference in its entirety.

Industrial Applicability

As described above, the radio communication method and the base station according to this embodiment can provide a radio communication method and a base station that allows mobile stations to perform stable communications at a cell edge of the base station including multiple antenna elements. Accordingly, the radio communication method and the base station according to this embodiment are useful in radio communications such as mobile communications.

The invention claimed is:

1. A radio communication method used in a base station having multiple antenna elements, the method comprising the steps of:
    setting an inner zone and an outer zone by dividing a cell formed by the base station into two;
    determining whether a mobile station is located in the inner zone or the outer zone, on the basis of a predetermined criterion;
    notifying the mobile station located in the inner zone of control information including information on channel allocation and a communication method, through a broadcast channel; and
    notifying only the mobile station located in the outer zone of the control information through a dedicated channel by beamforming using the multiple antenna elements,
    wherein in the step of setting the inner zone and the outer zone, a zone size of the outer zone is set based on a beamforming gain calculated according to the number of multiple antenna elements.

2. The radio communication method according to claim 1, wherein:
    in the step of determining, determination is made whether or not the mobile station located in the inner zone has reached an end of the inner zone by moving towards the outer zone; and
    in the step of notifying the control information through the dedicated channel, the dedicated channel is allocated to the mobile station that has reached the end of the inner zone.

3. The radio communication method according to claim 1, wherein in the step of determining, at least one of path loss, received signal strength, a signal-to-interference-plus-noise ratio, and an amount of interference, which are detected during communication with the mobile station, is used as the predetermined criterion.

4. The radio communication method according to claim 1, wherein in the step of setting the inner zone and the outer zone, the zone size of the outer zone is set based on the beamforming gain obtained when a maximum number of multiplexed spaces by the SDMA scheme are used.

5. A radio communication method used in a base station having multiple antenna elements, the method comprising the steps of:
- setting an inner zone and an outer zone by dividing a cell formed by the base station into two;
- determining whether a mobile station is located in the inner zone or the outer zone, on the basis of a predetermined criterion;
- notifying the mobile station located in the inner zone of control information including information on channel allocation and a communication method, through a broadcast channel; and
- notifying only the mobile station located in the outer zone of the control information through a dedicated channel by beamforming using the multiple antenna elements,
- wherein in the step of setting the inner zone and the outer zone, the inner zone and the outer zone are set in a way that a part of the inner zone overlaps with a part of an outer zone formed by an adjacent base station, and the inner zone does not overlap with an inner zone formed by the adjacent base station.

6. The radio communication method according to claim 5, further comprising the step of:
- controlling a first period and a second period by time division, where communications with the mobile station located in the inner zone are performed in the first period, and where communications with the mobile station located in the outer zone are performed in the second period, wherein
- the first period is synchronized with the first period for the adjacent base station, and
- the second period is synchronized with the second period for the adjacent base station.

7. The radio communication method according to claim 6, wherein in the step of controlling, at least for every frame, a time division ratio between the first period and the second period is optimized according to a communication condition of the base station.

8. A base station having multiple antenna elements, comprising:
- a setting unit configured to set an inner zone and an outer zone by dividing a cell formed by the base station into two;
- a determination unit configured to determine whether a mobile station is located in the inner zone or the outer zone, on the basis of a predetermined criterion; and
- a communication controller configured to notify the mobile station located in the inner zone of control information including information on channel allocation and a communication method, through a broadcast channel, wherein
- the communication controller notifies only the mobile station located in the outer zone of the control information through a dedicated channel by beamforming using the multiple antenna elements, and
- the setting unit sets the inner zone and the outer zone in a way that a part of the inner zone overlaps with a part of an outer zone formed by an adjacent base station, and the inner zone does not overlap with an inner zone formed by the adjacent base station.

* * * * *